Aug. 14, 1934.  P. G. PALMGREN  1,969,940
ROLLING MILL AND THE LIKE
Filed March 8, 1934
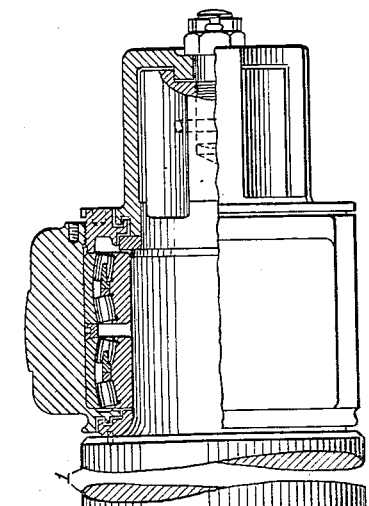
INVENTOR
PER GUNNAR PALMGREN
BY
ATTORNEY Patented Aug. 14, 1934

1,969,940

UNITED STATES PATENT OFFICE 1,969,940

ROLLING MILL AND THE LIKE

Per Gunnar Palmgren, Gottenborg, Sweden, assignor to Aktiebolaget Svenska Kullagerfabriken, Gottenborg, Sweden, a corporation of Sweden Application March 8, 1934, Serial No. 714,591
In Germany April 18, 1933

12 Claims. (Cl. 80—54)

This invention relates to mounting anti-friction bearings on a roll neck inwardly of a wobbler formed outwardly of the bearing seat and has for an object to provide means for holding the bearing on its seat, such means being capable of attachment to the outboard end of the wobbler.

Another object of the invention is to provide a bearing securing means extending inwardly from the outboard end of the wobbler for engaging the bearing, being so constructed that the coupling between the driving shaft and the wobbler may directly engage the driving faces ordinarily formed on the wobbler.

It is perhaps advisable at this point to state the purpose of couplings in rolling mills in general. They serve as a connection between the stationary drive and the rolls and have been adopted because of the necessity for removing rolls from time to time. Many mills are arranged in such a way that the torque is transmitted from the pinion stand to a so-called train of stands and each pinion is connected horizontally with a line of rolls, spindles and couplings. One may say that this line represents a shaft which is broken up in two places between stands. The reason for the use of couplings is not only to make roll changes possible, but also to permit a certain angularity in the drive line. This angularity is, of course, not desirable but must be tolerated as it is impossible to have all the rolls in the different stands of equal diameter.

The ordinary design of the coupling arrangement comprises a spindle of the same cross-section as the wobbler and two coupling boxes or muffs which slip over the wobbler and cover a length of the spindle equal to that of the wobbler. Accordingly, the inside contour of the muff is approximately the same as that of the wobbler. It is evident that in order to remove couplings and spindles, the total length of the spindle must be slightly more than twice the length of the muffs. To provide for the oblique position of the spindles, it is necessary that a certain clearance between the muffs, wobblers and spindles is present.

When these couplings are used in conjunction with plain bearing mills, the length of the roll neck corresponds to the length of the plain bearing which has been determined from the permissible specific bearing pressure. The wobbler begins immediately outside of the bearing. However, when roller bearings are employed, it is necessary to provide for the lateral locking device for the bearings, and usually this has been accomplished by means of extending the length of the roll neck a few inches to permit the incorporation of a split threaded ring placed in a groove on the neck on which ring locknuts are threaded. It is thus evident that the application of roller bearings to roll necks in an existing mill, that is, a changeover job, may encounter difficulties because of lack of lateral space in the rolling mill. At any rate, such a changeover will only be possible if new couplings and shorter spindles be made, and this, of course, is objectionable to the prospect and, in some cases, impossible for technical reasons.

With these viewpoints in mind, it is easy to see why the new design of couplings was worked out. It can be said that the design primarily is a locking device for the lateral stabilization of the anti-friction bearings, and that the purpose of this locking device is to obtain positive lateral stabilization with a minimum length of roll neck. This is accomplished as the lateral fastening arrangement of the locking sleeve has been moved to the end of the wobbler where otherwise useless space has been usefully occupied. This locking device will thus substantially increase the possibilities for changing over plain bearing rolling mills to anti-friction bearings and is equally well adapted to newly equipped mills as it provides for a more compact arrangement of the entire rolling mill than has been possible to obtain with other locking devices.

It has previously been suggested to fix anti-friction bearings axially on the necks of rolling mill rolls by means of a closed sleeve surrounding the wobbler. This sleeve is usually fixed in position by a screw, entering axially into the end of the neck. In such constructions, however, the wobbler, integral with the roll, is inaccessible for transmitting the torque, and a wobbler has, therefore, been provided on the outer circumference of the sleeve, through which torque is transmitted from the coupling. The use of this design is, however, connected with a number of disadvantages. Thus there will be play at two places, namely between the sleeve and the wobbler and between the coupling and the sleeve, which entails an injurious increase in the amount of play. Further the dimensions of the sleeve must be sufficiently great to enable it to transmit the required torque to the roll. An increase in the dimensions of the sleeve entails increased dimensions in the coupling surrounding the sleeve.

The present invention has for its purpose to provide a design in which the above mentioned inconveniences will be avoided and consists mainly in that the sleeve is provided with apertures so formed and disposed that the torque transmitting member (e. g. the coupling) can directly engage the roll neck or wobbler for transmitting the torque to or from.

With this construction there will be play only at one place. The sleeve does not transmit any torque and can therefore be dimensioned solely for the force required for axially fixing the bearing or bearings.

One form of the invention is illustrated in the accompanying drawing:

Figure 1 shows partly in section a rolling mill roll with its bearings and coupling.

Fig. 2 shows an end view of the construction of Fig. 1, with the jack shaft removed.

Figs. 3 and 4 show an end view and axial section respectively of the coupling member, sometimes called a muff.

Fig. 5 is a cross section taken at the line 5—5 of Fig. 1.

Fig. 6 is an isometric projection showing the sleeve or crown used for holding the outermost bearing to its seat, and Fig. 7 is a perspective of the roll neck and the wobbler.

The roll 1 is shown having a neck portion comprising two stepped reductions 2 and 3, there being a shoulder 4 inwardly of the smaller and outer bearing seat 3. On the seats 2 and 3 of the roll neck there are shown mounted roller bearings 5 and 6 which bearings are mounted in housing 7 in which they are retained by means of a closure member 8 screwed into the housing. The outer race member of the bearing 6 is shown divided into two ring portions 9 and 10 to make it possible to adjust the internal fit of such bearings thru the closure member 8 in order to afford the desired internal preloading of the bearing. The member 8 can be locked at various positions of adjustment by means of a screw 11.

Outwardly of the bearing seats the roll neck is reduced and constructed as a wobbler 12. Practically the reduced neck end is gouged out making the wobbler substantially cruciform in cross section, there being afforded a number of driving faces 13 for the engagement of the coupling member or muff, presently to be described.

The inner race ring 14 of the bearing 6 is illustrated as being axially fixed as follows: The inner side face of such race ring 14 abuts against the shoulder 4 on the roll neck while the outer side face is engaged by a ring 15 which is retained in position by means of a sleeve 16, see Fig. 1. This sleeve has an annular end portion 17 which is formed to cooperate with the closure member 8 so that the two members together form a labyrinth seal. The sleeve 16 is fixed in position by means of a screw 180 and nut 18. A depression 181 in the end of the sleeve receives the nut. Apertures 19 are formed in the end portion and the cylindrical portion of the sleeve 16. The end of the sleeve will therefore be cruciform in shape conforming to the general outline of the wobbler and from each of its four arms 20 there extends an arm 21 which is connected to the annular portion 17. The sleeve, therefore, resembles a crown in shape. The apertures 19 are larger than the apertures or recesses gouged out of the wobbler. In other words, the width 22 of the arms 20 and 21 is less than the width 23 of the projecting portions of the wobbler.

The coupling member or muff 24 is formed interiorly to fit the wobbler 12 and claws 25 formed on the end of the jackshaft 26. The internal diameter 27 of the coupling member must, however, be so great that there will be play permitted between it and the arms 21 of the sleeve 16. This is shown in Figs. 2 and 5 from which it is apparent that when torque is being transmitted the coupling member will directly engage the wobbler faces 13 while the sleeve 16 is not subjected to any torsional stress. For the purpose of centering the sleeve 16 it is provided at its outward end with an inwardly facing flange 28 which engages the cylindrical side face of a corresponding recess 29 in the end of the wobbler.

The construction according to the invention is specially suitable for use when modernizing rolling mills by the application of anti-friction bearings to existing rolls. The drawing illustrates a construction of this kind. In order to utilize the load transmitting capacity of the side faces 23 of the wobbler 12 as far as possible the coupling 24 is provided with projecting portions 30 whereby engagement can be obtained along the whole length of the wobbler faces 13, while still leaving space for the closure member 8 and the seal.

Having thus described my invention I claim and desire to secure by Letters Patent:

1. The combination with a roll having a neck formed with a bearing seat and outwardly of the seat with faces for transmitting torque, and a sleeve fixed to the outboard end of the neck and having an inboard portion for engaging a bearing on the seat and forcing this inwardly, the sleeve being formed with arms so located and disposed that a torque transmitting member may pass between the arms and directly engage the said torque transmitting faces of the wobbler.

2. The combination with a roll having a neck formed with a bearing seat and outwardly of the seat with faces for transmitting torque, and a sleeve fixed to the outboard end of the neck and having an inboard portion for engaging a bearing on the seat and forcing this inwardly, the sleeve being formed with arms so located and disposed that a torque transmitting member may pass between the arms and directly engage the said torque transmitting faces of the wobbler and a coupling muff having torque transmitting members passing between the arms and engaging the said torque transmitting faces.

3. The combination with a roll having a neck formed with a bearing seat and outwardly of the seat with a wobbler having faces for transmitting torque, of a sleeve fixed to the outboard end of the neck and having an inboard portion for engaging a bearing on the seat and forcing this inwardly, the sleeve being formed with arms so located and disposed that engaging portions of a torque transmitting coupling muff may pass between the arms and directly engage the torque transmitting faces of the wobbler, and the said coupling muff having inwardly directed portions for engaging the torque transmitting faces of the wobbler and of a jackshaft.

4. The combination with a roll having a neck formed with a bearing seat and outwardly of the seat with a wobbler having faces for transmitting torque, of a sleeve fixed to the outboard end of the neck and having an inboard portion for engaging a bearing on the seat and forcing this inwardly, the sleeve being formed with arms so located and disposed that engaging portions of a torque transmitting coupling muff may pass between the arms and directly engage the torque transmitting faces of the wobbler, the said coupling muff having inwardly directed portions for engaging the torque transmitting faces of the wobbler and of a jackshaft, and a jackshaft having torque transmitting faces for engaging the said faces of the muff.

5. The combination with a roll having a neck formed with a bearing seat and outwardly of the seat with a wobbler, it having a cruciform cross section presenting longitudinal faces for transmitting torque, and a sleeve fixed to the outboard end of the neck and having at its inboard end an annular portion for abutting a bearing on the seat and forcing this inwardly, the sleeve at its outboard end being cruciform with arms overlying the wobbler and so located and disposed that a torque transmitting member may pass between the arms and directly engage the said torque transmitting faces.

6. The combination with a roll having a neck formed with a bearing seat and outwardly of the seat with a wobbler, it having a cruciform end and cross section and presenting longitudinal faces for transmitting torque, and a sleeve having a cruciform end fixed to the outboard end of the neck and having at its inboard end an annular portion for abutting a bearing on the seat and forcing this inwardly, the sleeve having arms extending from the said annular portion to its outboard end and overlying the wobbler such arms being so located and disposed that a torque transmitting member may pass between the arms and directly engage the said torque transmitting faces.

7. The combination with a roll having a neck formed with a bearing seat, a positioning seat inwardly thereof and outwardly of the seat with faces for transmitting torque, of a bearing located on the seat, and a sleeve fixed to the outboard end of the neck and having an inboard portion for engaging the bearing on the seat and forcing this inwardly against the positioning shoulder, the sleeve being formed with arms so located and disposed that a torque transmitting member may pass between the arms and directly engage the torque transmitting faces of the wobbler.

8. The combination with a roll having a neck formed with a bearing seat, a positioning seat inwardly thereof and outwardly of the seat with faces for transmitting torque, of a bearing located on the seat, and a sleeve fixed to the outboard end of the neck and having an inboard portion for engaging the bearing on the seat and forcing this inwardly against the positioning shoulder, the sleeve being formed with arms so located and disposed that a torque transmitting member may pass between the arms and directly engage the torque transmitting faces of the wobbler, and a coupling muff having torque transmitting members passing between the arms and engaging the said torque transmitting faces.

9. The combination with a roll having a neck formed with a bearing seat, a positioning seat inwardly thereof and outwardly of the seat with faces for transmitting torque, of a bearing located on the seat, and a sleeve affixed to the outboard end of the neck and having an inboard portion for engaging the bearing on the seat and forcing this inwardly against the positioning shoulder, the sleeve being formed with arms so located and disposed that a torque transmitting member may pass between the arms and directly engage the torque transmitting faces of the wobbler, a coupling muff having torque transmitting members passing between the arms and engaging the said torque transmitting faces, and a jackshaft having torque transmitting faces for engaging the said faces of the muff.

10. The combination with a roll having a neck formed with a bearing seat and outwardly of the seat with a wobbler having faces for transmitting torque, of a sleeve fixed to the outboard end of the neck and having an inboard portion for engaging a bearing on the seat and forcing this inwardly, the sleeve being formed with arms so located and disposed that engaging portions of a torque transmitting coupling muff may pass between the arms and directly engage the torque transmitting faces of the wobbler, and the said coupling muff having inwardly directed portions for engaging the torque transmitting faces of the wobbler and of a jackshaft, and a jackshaft having torque transmitting faces for engaging the said faces of the muff.

11. The combination with a roll having a neck formed with a bearing seat and outwardly of the seat with a wobbler, it having a cruciform cross section presenting longitudinal faces for transmitting torque, and a sleeve fixed to the outboard end of the neck and having at its inboard end an annular portion for abutting a bearing on the seat and forcing this inwardly, the sleeve at its outboard end being cruciform with arms overlying the wobbler and so located and disposed that a torque transmitting member may pass between the arms and directly engage the said torque transmitting faces, and a coupling muff having torque transmitting members passing between the arms and engaging the said torque transmitting faces.

12. The combination with a roll having a neck formed with a bearing seat and outwardly of the seat with a wobbler, it having a cruciform end and cross section and presenting longitudinal faces for transmitting torque, and a sleeve having a cruciform end fixed to the outboard end of the neck and having at its inboard end an annular portion for abutting a bearing on the seat and forcing this inwardly, the sleeve having arms extending from the said annular portion to its outboard end and overlying the wobbler, such arms being so located and disposed that a torque transmitting member may pass between the arms and directly engage the said torque transmitting faces, a coupling muff having torque transmitting members passing between the arms and engaging the said torque transmitting faces, and a jackshaft having torque transmitting faces for engaging the said faces of the muff.

PER GUNNAR PALMGREN.